United States Patent [19]

Huang

[11] Patent Number: 4,504,147

[45] Date of Patent: Mar. 12, 1985

[54] ANGULAR ALIGNMENT SENSOR

[76] Inventor: Cheng-Chung Huang, 1610 Eagle Dr., Sunnyvale, Calif. 94087

[21] Appl. No.: 287,676

[22] Filed: Jul. 28, 1981

[51] Int. Cl.³ .............................................. G01B 9/02
[52] U.S. Cl. .................................... 356/363; 356/353
[58] Field of Search ......................... 356/353, 363, 357

[56] References Cited

U.S. PATENT DOCUMENTS 3,729,260 4/1973 Walsh .................................. 356/363
4,395,123 7/1983 Minott ............................ 356/363 X

OTHER PUBLICATIONS

Crane, Jr., "The Angle-Scanned Interferometer", *Optical Engineering*, vol. 18, No. 2, pp. 205–211, Apr. 1979.

Primary Examiner—Davis L. Willis
Assistant Examiner—Matthew W. Koren
Attorney, Agent, or Firm—Townsend and Townsend

[57] ABSTRACT

A sensor for measuring angular deviations of a radiation beam relative to a reference plane. The sensor comprises a shearing interferometer block formed of a beamsplitter cube having a first reflecting device on one face of the cube for forming a first exit beam and a second reflecting device on the opposite face of the cube for forming a second exit beam. The first device can be a corner cube or a flat block mirror. The second device can be a right angle prism for one dimensional measurements and a 90° pyramid prism for two-dimensional measurements. A photo-detector unit is adjacent to and spaced from the beam splitter cube and has a number of detector members across the path of travel of the wavefronts of the exit beams. The detector members provide output signals which can be used to calculate the angular deviation of the incoming beam from a normal to the reference plane. The optical path difference between the two arms of the interferometer block are equal substantially to odd multiples of one-fourth the wavelength of the incoming radiation. The sensor is accurate to better than 0.001 arc seconds of angular measurements for a photodetector unit whose maximum transverse dimension is 2.5 cm.

20 Claims, 17 Drawing Figures

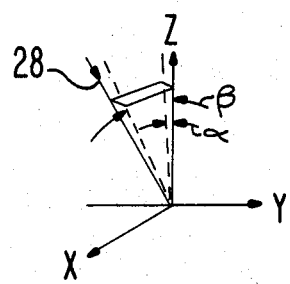
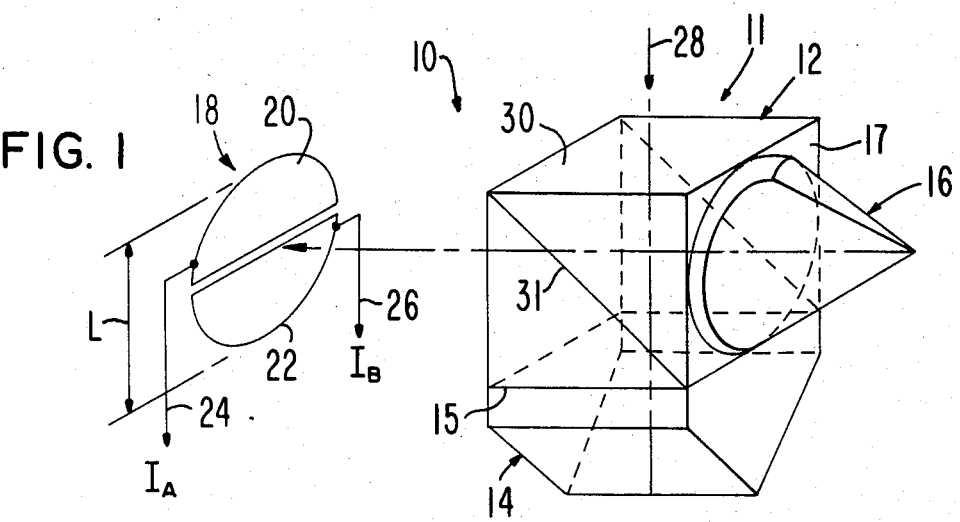
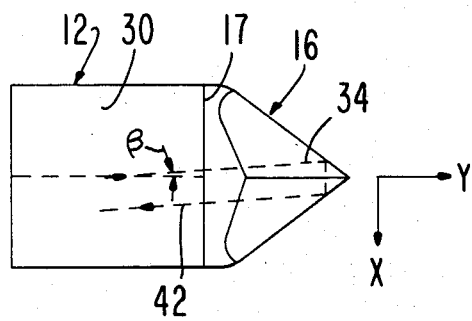
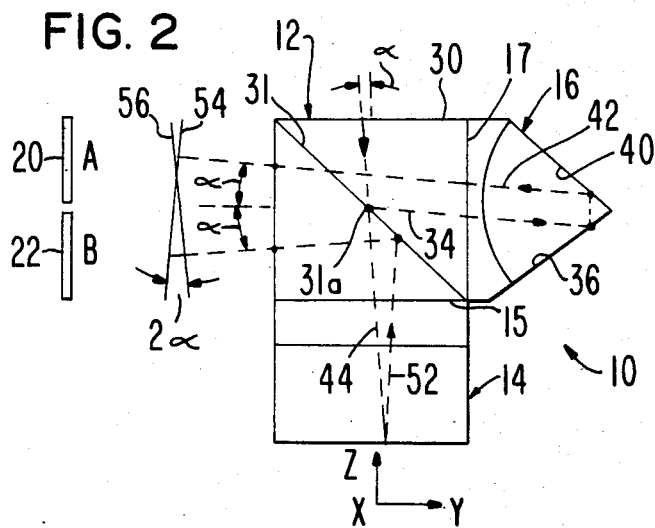
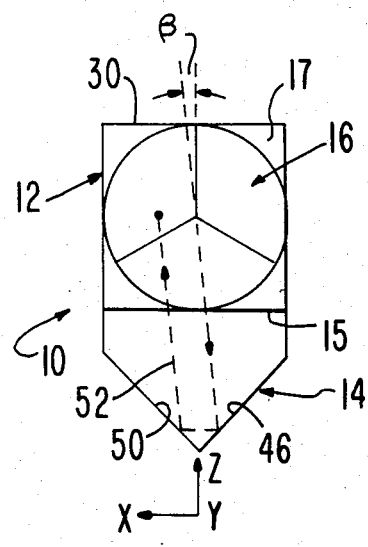

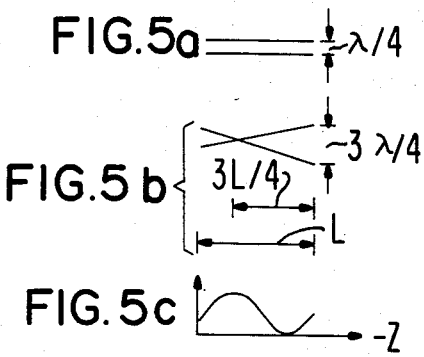
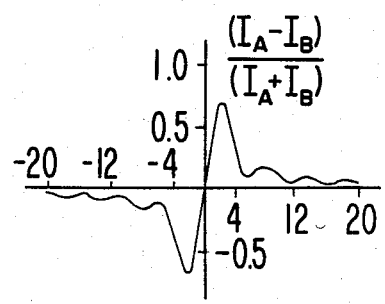
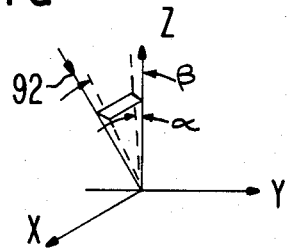
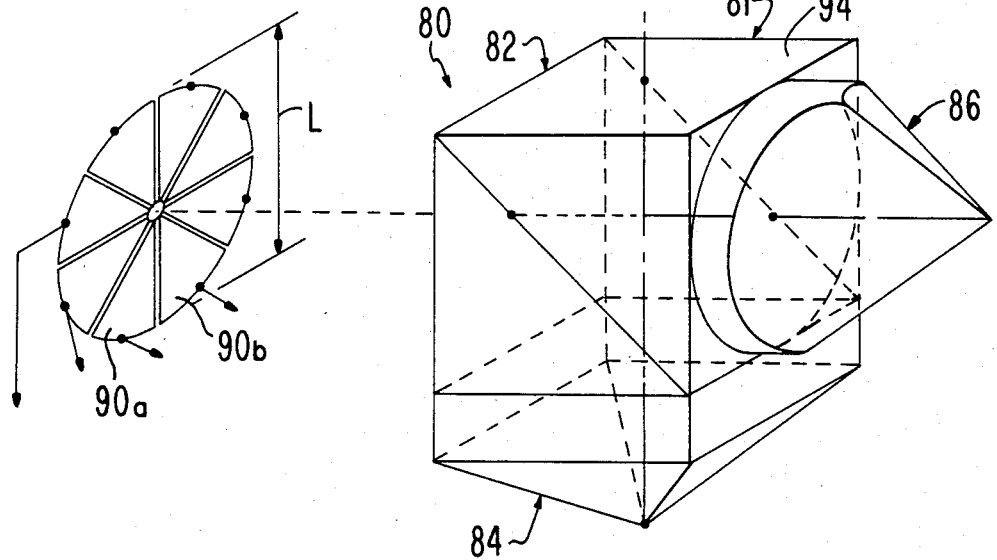

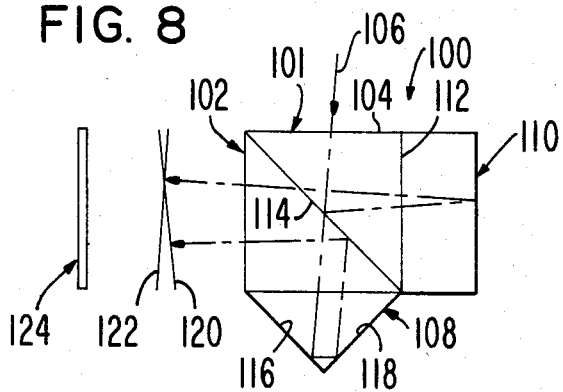
FIG. 8
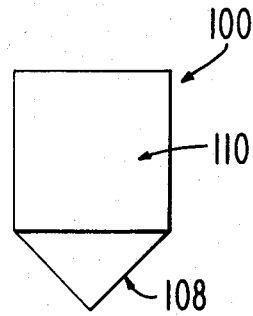
FIG. 9
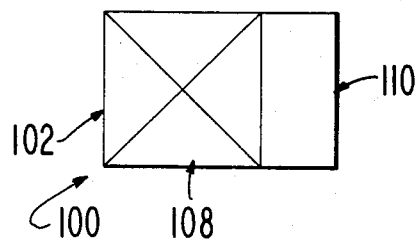
FIG. 10
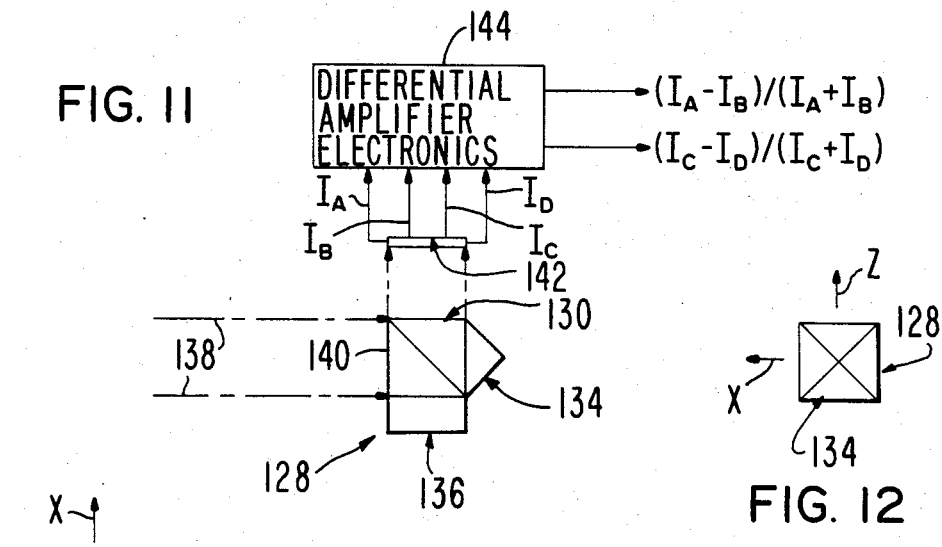
FIG. 11
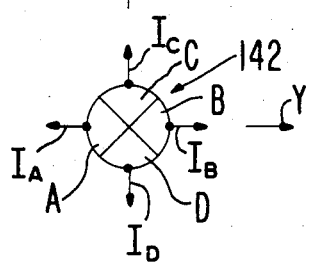
FIG. 12
FIG. 13

ANGULAR ALIGNMENT SENSOR

This invention relates to improvements in the optical determination of angular measurements of radiation beams, and more particularly, to apparatus and a method for sensing angular alignments of radiation beams relative to a reference plane.

BACKGROUND OF THE INVENTION

Various techniques for measuring angular measurements of radiation beams relative to a reference plane have been known and used in the past. Typical of these are the ones known as the quad cell technique and the knife edge concept, both of which have been practiced for a number of years. The state of the art requirement for measuring small angular deviations with devices of this type is 0.1 arc second. In all conventional techniques now practiced in this field, none has been able to meet this requirement because each such conventional technique has been carried out with structural components which are not capable of providing the necessary precision for angular measurements of such small magnitudes. As a result, a need has existed for some time for improvements in such techniques so that the state of the art requirement can be attained without the use of complex and expensive structural features.

SUMMARY OF THE INVENTION

The present invention satisfies the aforesaid need by providing an improved apparatus and method for measuring angular deviations of an incoming beam relative to the normal to a reference plane. To this end, the present invention comprises an improved shearing interferometer block associated with photo-detector unit in which the block comprises a beamsplitter cube having first and second beam reflecting devices secured to respective, adjacent faces of the cube. The first reflecting device receives a first part of an incoming radiation beam reflected by an interior reflecting plane of the beamsplitter cube and reflects it back through the cube and out of the same to form a first wavefront which travels to the photo-detector unit. The second reflecting device reflects a second part of the incoming radiation which has passed through the interior reflecting plane of the beamsplitter cube, the reflected second part of the beam forming a second wavefront which travels along with the first wavefront but usually at an angle relative thereto toward the photo-detector unit. The angle between the wavefronts is directly related to the angular deviation to be measured.

The optical path difference between the arms of the interferometer block is equal to odd multiples of one-fourth the wavelength of the incoming radiation. The wavefronts of the exit beams from the interferometer block are tilted in opposite directions from a moving incoming beam in a particular plane of an X-Y-Z coordinate system.

The output of the photo-detector unit provides a number of electronic signals which can be used to calculate the angular deviation of the incoming beam relative to the reference plane. The accuracy of measurement provides a decision measurement of the deviation to better than 0.001 arc seconds, a value that is two orders of magnitude greater than the actual state of the art requirement for devices of this type. Thus, the present invention provides a substantial advance in the art of measuring small angles and has a wide variety of applications in which it is desired to measure the precision angle of slow angular varying radiations or precision angular orientation of spaced platforms.

The primary object of the present invention is to provide an improved apparatus and method for measuring angular deviation of incoming radiation beams relative to a reference plane wherein the incoming beam is reflected at two different zones to form a pair of travelling wavefronts which are tilted with reference to each other as they move toward a photo-detector unit whereby the output signals from the detector unit can be used to provide a measure of the angles and when the apparatus is constructed to provide an optical path difference based on the multiples of a predetermined fraction of the wavelength of the incoming radiation.

Other objects of this invention will become apparent as the following specification progresses, reference being had to the accompanying drawings for an illustration of the invention.

IN THE DRAWINGS

FIG. 1 is a schematic view of an angular alignment sensor for use in precision, one-dimensional angular measurements in accordance with the teachings of the present invention;

FIG. 1a is the X-Y-Z coordinate system for establishing a reference for the incoming radiation to the sensor of FIG. 1;

FIG. 2 is a side-elevational view of the sensor of FIG. 1, showing the incoming radiation to an interferometer block deflected by a right angle prism and a corner cube attached to a beamsplitter cube of the interferometer block;

FIG. 3 is a top plan view of the interferometer block;

FIG. 4 is an end elevational view of the interferometer block;

FIGS. 5a through 5c are graphic illustrations showing the optical path difference between the wavefronts from the interferometer block and the maximum intensity of the interference pattern thereof with reference to the signal outputs of a pair of photodetectors forming a part of the sensor;

FIG. 6 is a curve showing the theoretical outputs of the photodetectors versus the angle of incidence for an incoming radiation beam for a given wavelength of the incoming radiation;

FIG. 7 is a view similar to FIG. 1 but showing an improved angular alignment sensor suitable for two-dimensional angular measurement;

FIG. 7a is a view similar to FIG. 7 but showing the coordinate system for referencing the incoming radiation to the sensor of FIG. 7;

FIG. 8 is a schematic view of one side of a modified version of the sensor of FIG. 7;

FIG. 9 is an end elevational view of the modified sensor shown in FIG. 8;

FIG. 10 is a bottom plan view of the sensor of FIG. 8;

FIG. 11 is a schematic view of a sensor block for two-dimensional angular measurement using a quad photodetector unit;

FIG. 12 is an end elevational view of the sensor of FIG. 11; and

FIG. 13 is a plan view of the photodetector unit of the sensor of FIG. 11.

A first embodiment of the angular alignment sensor of the present invention is broadly denoted by the numeral 10 and is illustrated in FIGS. 1-4. Sensor 10 includes a shearing interferometer block 11 and a photodetector means 18 adjacent to block 12 for receiving radiation beams exiting from the block.

Block 10 is comprised of a beamsplitter cube 12, a right angle prism 14 coupled in any suitable manner, such as by optic cement, to one face 15 of cube 12, and a corner cube 16 coupled in any suitable manner to a second face 17 of cube 12, faces 15 and 17 being adjacent to each other as shown in FIGS. 1, 2 and 4. Cube 12, prism 14 and cube 16 are used with detector means 18 which includes a pair of hemispherical photodetector members 20 and 22 having respective electrical leads 24 and 26 for detecting electrical signals generated when radiation beams emanating from interferometer block 11 strike members 20 and 22. Block 11, together with detector means 18, is used to measure the angle of an incoming radiation beam 28 (FIG. 1) with reference to the flat end face 30 of beam splitter cube 12, the incoming radiation coming from a suitable source so that the source and face 30 can be considered as two separate platforms whose relative angular alignment is to be determined by sensor 10. Sensor 10 is capable of measuring deviations of the incoming radiation beam 28 relative to face 30 when the beam is almost normal to face 30 to better than 0.001 arc seconds. For purposes of illustration, FIG. 1a shows how beam 28 is assumed to be deviated at an angle $\alpha$ with respect to the Z axis in a Y-Z plane and at an angle $\beta$ with respect to the Z axis in the X-Z plane, the X-Y plane being considered the plane of face 30 of cube 12.

The incoming radiation beam 28 which strikes face 30 of cube 12 penetrates the cube. A part of the beam is reflected by the interior reflecting plane 31 toward corner cube 16, and another part of the beam is transmitted through plane 31 toward right angle prism 14. The part of the beam reflected by plane 31 is denoted by a beam segment 34 (FIGS. 2 and 3) directed into corner cube 16. Face 36 of corner cube 16 reflects the beam toward and onto face 40 of corner cube 16, and a beam segment 42 is reflected from face 40 and is directed into and through cube 12 toward the upper detector member 20 along an angle $\alpha$ which is measured with reference to a plane parallel to face 30 and passing through a point 31a (FIG. 2) on plane 31 at which reflection of the incoming beam 28 occurs. Beam segment 42 forms a wavefront 54 which travels toward detector members 20 and 21 (FIG. 2).

The portion of the incoming radiation beam which is transmitted through reflecting face 31 is represented by a beam segment 44 which strikes one reflecting face 46 of prism 14, it then reflected laterally and strikes the other reflecting face 50 of prism 14. Face 50 reflects the beam to form a beam segment 52 which passes upwardly and strikes reflecting plane 31 from which it is reflected laterally toward detector member 22 and forms a beam segment 53 which is at an angle $\alpha$ with reference to a plane parallel to face 30 passing through point 31a. Beam segment 53 forms a wavefront 56 which travels toward detector members 20 and 22.

The two arms of interferometer block 11 have an optical path difference equal to odd multiples of $\lambda/4$ as indicated in FIG. 5a, for maximum sensitivity, where $\lambda$ is the wavelength of the incoming radiation. The two wave fronts 54 and 56 (FIG. 2) of the exit beams 42 and 53 are tilted in opposite directions with respect to the plane parallel to face 30 and passing through point 31a on plane 31. Wave fronts 54 and 56 are generally parallel with each other for an input beam in the X-Z plane.

Thus, the interference pattern is parallel to the X axis and changes in the Z direction on the detector plane of detector members 20 and 22 for a moving incoming radiation beam independent of the incident angle $\beta$ (where $\beta$ is small).

Assuming that the photo-current from detector member 20 is $I_A$ and the photo-current from detector member 22 is $I_B$, a theoretical characteristic curve shown in FIG. 6 can be plotted from calculations using incident beam angles $\alpha$ which deviate from the normal with respect to face 30 of cube 12. The curve in FIG. 6 crosses the zero point of the X-Y-Z coordinate system when detector members 20 and 22 receive the same optical power or the normalized output $(I_A-I_B)/(I_A+I_B)=0$ which corresponds to the case when wavefronts 54 and 56 are parallel with each other. Assuming that the optical path difference is $\lambda/4$ for this case, as shown in FIG. 5a, then the differential maximum and minimum outputs for detector means 18 occur just before and after the zero crossing associated with normal incidence of the incoming beam. The outputs can be estimated. The maximum output occurs when the interference pattern maximum intensity is near the center of one detector member, such as member 20, and the minimum intensity is near the center of the other detector member, such as member 22. This is shown by the curve in FIG. 5c. The angular separation between the maximum and minimum values of $(I_A-I_B)/(I_A+I_B)$ is approximately $2\alpha_M=(3\lambda/4)/(3L/4)=\lambda/L$ where L is the diameter of detector means 18. For $\lambda=633$nm and $L=2.5$ cm, and uniform illumination of block 10, the result is $2\alpha=20$ microradians or 4 arc seconds.

A study of the plot of FIG. 6 shows that, as the incident angle becomes larger, the interference pattern becomes denser and the optical power directed onto detector members 20 and 22 becomes balanced and the sensor output approaches zero. The reason for measuring the zero crossing of $(I_A-I_B)/(I_A+I_B)$ instead of $(I_A-I_B)$ is to minimize induced error due to laser power fluctuations. It is to be noted that the peak signal output in FIG. 6 is about 70% of the output when the total incident power is on one of the two detector members 20 and 22. If the optical path difference is an exact multiple of $\lambda/2$, a zero output of $(I_A-I_B)/(I_A+I_B)$ will occur due to an equal intensity of the interference pattern on each of the detector members 20 and 22. Thus, it is desirable to keep the optical path difference as close as possible to odd multiplies of $\lambda/4$. When the optical path difference is $\lambda/4$, block 11 can be used for angular measurements of radiation having wavelengths in a broad band. Typical of such radiation is the radiation from a white light source. As long as the detector members are fully illuminated, the alignment of detector means 18 relative to block 10 is not critical. This is because the intensity of the interference pattern is uniform and the two detector member 20 and 22 always receive the same amount of optical power (which is insensitive to the detector position) to provide zero differential output for normal incidence.

While FIG. 6 shows a theoretical curve of $(I_A-I_B)/(I_A+I_B)$ versus incident angle from the normal, experimental results have been obtained which are in general agreement with the curve of FIG. 6. The experimental results have also shown an angular resolution of 0.001 arc second obtained by this device.

Sensor 10 described above with respect to FIGS. 1–6 is generally only sensitive to angular measurements in one dimension or along one axis. An improvement of the present invention provides for two-dimensional angular measurements. To this end, a modified version of sensor 10 is shown in FIGS. 7 and 7a and denoted by the numeral 80. Sensor 80 includes an interferometer block 81 having a beamsplitter cube 82, a 90° pyramid prism 84 and a corner cube 86. Thus, block 81 is substantially the same in construction as block 11 except that right angle prism 14 of block 11 has been replaced by pyramid prism 84 to form block 81.

Detector means 88 is associated with block 80 and includes an octet photo detector comprised of eight detector members of generally equal size and shape, the detector members being pie-shaped and surrounding a common center as shown in FIG. 7. A pair of detector members 90a and 90b sense the incident angle of input beam in the X-Z plane, namely angle α as shown in FIG. 7a. The zero crossing precision of block 81, as might be found in a theoretical curve of the type shown in FIG. 6, is degraded by a factor of less than 2, thereby making it more than adequate as a two-dimensional angular alignment sensor to identify the normal incident of an input beam 92 directed toward and onto the flat face 94 of beam splitter cube 82.

A modified version of the two-dimensional sensor of the type described with respect to FIG. 7 is shown in FIGS. 8-10 and is denoted by the numeral 100. Sensor 100 includes a interferometer block 101 having a beamsplitter cube 102 with a flat face 104 onto which an incoming radiation beam 106 is directed. A 90° pyramid prism 108 is secured to the face of beam splitter 102 opposite the face 104, and a flat mirror block 110 is secured to a face 112 between faces 104 and 108 as shown in FIG. 8. Incoming beam 106 is shown in FIG. 8 as passing through a reflecting plane 114 of beamsplitter cube 102 and then striking and being reflected by a pair of surfaces 116 and 118 of pyramid prism 108, back to plane 114 and then being reflected laterally by plane 114 to present a shearing wavefront 120. Similarly, a portion of the incoming beam is reflected laterally by plane 114 toward flat mirror block 110 and is reflected by mirror block 110 and passes through cube 102 to form a second shearing wavefront 122. The exit beams are detected by an quad photo detector 124 in alignment with the beams as shown in FIG. 8.

Sensor 100 permits measurement of an input radiation beam 106 when the beam is normal to the cube to better than 0.001 arc seconds. For white light radiations, the two arms of the interferometer block have optical path differences of λ/4. For coherent radiations, the two arms have optical path differences of odd multiplies of λ/4.

FIG. 11, 12, and 13 show a sensor 128 having an interferometer block 130 formed by a beamsplitter cube 132 provided with a 90° pyramid prism 134 coupled to one face thereof and a flat block mirror 136 coupled to an adjacent face. Incoming radiation denoted by arrow 138 strikes a flat face 140 of cube 132, face 140 being opposite to the face 133 to which prism 134 is coupled.

A quad photo detector means 142 is associated with block 130 for receiving the exit beams therefrom. The two arms of the interferometer block (one interferometer forming interference in the X direction and the other interferometer forming interference patterns in the Y direction) have optical path differences of λ/4. The wavefronts of the exit beams, one from the corner cube and the other from the pyramid prism are tilted in opposite directions from a scanning input beam. Zero crossings of the detector output occur when each receive the same optical power. Detectable maximum and minimum values occur just before and after the zero crossing associated with normal incidence of the incoming beam. A differential amplifier and electronics unit 144 coupled to detector means 142 is used to provide a visual display to indicate zero crossings of respective outputs of the detector members A, B, C and D of detector means 142 as indicated by $(I_A - I_B)/(I_A + I_B)$ and $(I_C - I_D)/(I_C + I_D)$.

The interferometer block and photo detector means of the present invention is suitable for a number of different uses including the following: The block can be used as a single axis reference for a rotating mirror; the block can provide a two-axis position readout so as to be able to monitor the position of a mirror. The block can serve to define a radiation source normal to a surface and the system can also be used to align two mirrors relative to each other. Finally, the system can be used as a star sensor as part of a telescope system used to track the position of a particular star.

What is claimed is:

1. An angular alignment sensor comprising: a shearing interferometer block having a reference plane toward which an incoming radiation beam is directed, the block having reflecting means therein for reflecting a first part of the beam in one direction and for allowing a second part of the beam to be transmitted in a second direction transverse to the first direction; corner cube means coupled with the block for reflecting the first part of the beam toward and through said reflecting means in a third direction to present a first wavefront travelling away from the block; prism means coupled with the block and having a pair of reflecting surfaces for reflecting the second part of the beam in a fourth direction, said second part of the beam being reflected by said reflecting means of the block in a fifth direction to form a second wavefront travelling away from the block and overlapping said first wavefront; and means spaced from the block for detecting said wavefronts, whereby the angle of incidence of the incoming beam relative to the reference plane can be determined.

2. A sensor as set forth in claim 1, wherein said block includes a beamsplitter cube having a 45° reflecting plane defining the reflecting means thereof.

3. A sensor as set forth in claim 1, wherein said block comprises a beamsplitter cube having a number of flat faces, a first face defining said reference plane, said corner cube means for reflecting the first beam part being on a second face, said prism means for reflecting a second part of the beam being on a third face, said detector means being aligned with and spaced laterally from a fourth face of the cube, said reflecting means in the block comprising a 45° reflecting plane extending from one end of the second face diagonally across the cube to one end of the fourth face.

4. A method of determining the angular alignment of a radiation beam with respect to a reference plane comprising: directing the incoming beam in a first direction through the reference plane; reflecting a first part of the beam in a second direction after the beam has passed through the reference plane and allowing a second part of the beam to continue in the first direction; reflecting the first part of the beam from a corner cube in a third direction substantially opposite to the first direction to form a first wavefront; reflecting the second part of the beam from a prism having a pair of second reflecting zones to cause it to travel substantially in a fourth direction and then in a fifth direction to form a second wavefront overlapping said first wavelength; detecting the wavefronts and determining the angle therebetween, whereby said angle will be a multiple of the angle between the incoming radiation and a line normal to the reference plane.

5. A method as set forth in claim 4, wherein the beam is reflected at a first zone to form said first part of the beam, said first part of the beam passing through the first zone after being reflected at a second zone spaced laterally from the first zone.

6. A method as set forth in claim 4, wherein the incoming beam passes through a first zone and is then reflected at a second zone spaced laterally from and aligned with the first zone, the second part of the beam being reflected by the first zone after being reflected at the second zone to form the second wavefront.

7. A method as set forth in claim 4, wherein the incoming beam forms a first angle $\alpha$ with respect to the Z axis in the Y-Z axis of an X-Y-Z coordinate system and the beam makes a second angle $\beta$ with reference to the Z axis in the X-Z plane of said coordinate system, said first part of the beam reflected at the first zone being at an angle $\beta$ relative to a plane perpendicular to the reference plane, said first and second parts of the beam making an angle $2\alpha$ as the first and second parts of the beam form the wavefronts and move away from said zone.

8. An angular alignment sensor comprising: a shearing interferometer block having a reference plane toward which an incoming radiation beam is directed, the block having reflecting means therein for reflecting a first part of the beam in one direction and for allowing a second part of the beam to be transmitted in a second direction transverse to the first direction; a corner cube coupled with the block for reflecting the first part of the beam in a third direction toward and through said reflecting means to present a first wavefront travelling away from the block; a right angle prism coupled with the block for reflecting the second part of the beam in a fourth direction, said second part of the beam being reflected by said reflecting means of the block in a fifth direction to form a second wavefront travelling away from the block and overlapping said first wavefront; and means spaced from the block for detecting said wavefronts, whereby the angle of incidence of the incoming beam relative to the reference plane can be determined.

9. An angular alignment sensor comprising: a shearing interferometer block having a reference plane toward which an incoming radiation beam is directed, the block having reflecting means therein for reflecting a first part of the beam in one direction and for allowing a second part of the beam to be transmitted in a second direction transverse to the first direction; a corner cube coupled with the block for reflecting the first part of the beam in a third direction toward and through said reflecting means to present a first wavefront travelling away from the block; a 90° pyramid prism coupled with the block for reflecting the second part of the beam in a fourth direction, said second part of the beam being reflected by said reflecting means of the block in a fifth direction to form a second wavefront travelling away from the block and overlapping said first wave front; and means spaced from the block for detecting said wavefronts, whereby the angle of incidence of the incoming beam relative to the reference plane can be determined.

10. A sensor set forth in claim 9, wherein the detector means includes a pair of photo-detector members, each photo-detector member has a semicircular shape and has a flat face across the path of travel of the wavefront of at least one of the beam parts.

11. A sensor as set forth in claim 9, wherein said detector means comprises a photo-detector unit having four photo-detector members, each photo-detector member having a flat face, the faces of the photo-detector members being in a common plane and surrounding a common central axis.

12. A sensor as set forth in claim 9, wherein said photo-detector means comprises eight photo-detector members, each member having a flat face and a pie-shaped configuration, the faces of the members being in a common plane and surrounding a common central axis.

13. An angular alignment sensor comprising: a shearing interferometer block in the form of a beamsplitter cube having a number of flat faces, a first face defining a reference plane toward which an incoming radiation beam is directed, the cube having a second face internally thereof for reflecting a first part of the beam in one direction and for allowing a second part of the beam to be transmitted in a second direction transverse to the first direction; first means coupled with the block and having a number of reflecting faces for reflecting the first part of the beam in a third direction to present a first wavefront travelling away from the block; second means on a third face of the cube and having a number of reflecting faces for reflecting the second part of the beam in a fourth direction and back toward said second face, said second face being operable to reflect the second part of the beam in a fifth direction to form a second wavefront travelling away from the block; and means aligned with and spaced laterally from a fourth face of the cube for detecting said wavefronts, whereby the angle of incidence of the incoming beam relative to the reference plane can be determined, said second face comprising a 45° reflecting plane extending from one end of the first face diagonally across the cube to one end of the third face, the difference in the number of reflecting faces of the first means and the second means providing an optical path difference between the paths of the first and second beam parts of substantially one-fourth of the wavelength of the radiation.

14. A sensor as set forth in claim 13, wherein the means for reflecting the first part of the beam comprises a corner cube and the means for reflecting the second part of the beam comprises a right angle prism.

15. A sensor as set forth in claim 13, wherein the means for reflecting the first part of the beam comprises a corner cube and the means for reflecting the second part of the beam comprises a 90° pyramid prism.

16. A sensor as set forth in claim 13, wherein said means for reflecting the first part of the beam comprises a flat block mirror and the means for reflecting the second part of the beam comprises a 90° pyramid prism.

17. A sensor as set forth in claim 13, wherein the detector means comprises a pair of semicircular, flat photodetector members in a plane substantially parallel to the plane of the fourth face of the beamsplitter cube.

18. A sensor as set forth in claim 13, wherein the detector means comprises four photo-detector members of equal size and shape, each member having a flat face, the faces of the members being in a common plane, said common place being generally parallel with the plane of the fourth face of the beamsplitter cube.

19. A sensor as set forth in claim 13, wherein said detector means comprises eight photo-detector means of equal size and shape, each member having a flat face, the faces of the members being in a common plane, said common plane being generally parallel with the plane of the fourth face of the beamsplitter cube.

20. An angular alignment sensor comprising: a sharing interferometer block having a reference plane toward which an incoming radiation beam is directed, the block having reflecting means therein for reflecting a first part of the beam in one direction and for allowing a second part of the beam to be transmitted in a second direction transverse to the first direction; a flat block mirror coupled with the block for reflecting the first part of the beam in a third direction to present a first wavefront travelling away from the block; a 90° pyramid prism coupled with the block for reflecting the second part of the beam in a fourth direction, said second part of the beam being reflected by the reflecting means of the block in a fifth direction to form a second wavefront travelling away from the block and overlapping said first wavefront; and means spaced from the block for detecting said wavefronts, whereby the angle of incidence of the incoming beam relative to the reference plane can be determined.

* * * * *